US008935655B2

(12) United States Patent
Channabasavaiah et al.

(10) Patent No.: US 8,935,655 B2
(45) Date of Patent: Jan. 13, 2015

(54) TRANSITIONING TO MANAGEMENT OF A SERVICE ORIENTED ARCHITECTURE SHARED SERVICE

(75) Inventors: Kishore Channabasavaiah, Palatine, IL (US); Stephen C. Kendrick, Fairfax, VA (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/392,567

(22) Filed: Feb. 25, 2009

(65) Prior Publication Data

US 2010/0217634 A1    Aug. 26, 2010

(51) Int. Cl.
*G06Q 10/06* (2012.01)
*G06F 9/44* (2006.01)
*G06Q 10/10* (2012.01)

(52) U.S. Cl.
CPC ............ *G06Q 10/06* (2013.01); *G06Q 10/0637* (2013.01); *G06F 9/44* (2013.01); *G06Q 10/101* (2013.01); *G06Q 10/067* (2013.01); *G06Q 10/06375* (2013.01); *G06Q 10/103* (2013.01)
USPC .............................................. 717/102; 705/7

(58) Field of Classification Search
CPC . G06Q 10/06; G06Q 10/0637; G06Q 10/101; G06Q 10/06375; G06F 9/44
USPC ................................................ 717/102; 705/7
See application file for complete search history.

(56) References Cited

U.S. PATENT DOCUMENTS

| 7,584,282 | B2 | 9/2009 | Reeves et al. |
| 8,036,909 | B2 | 10/2011 | Whitworth et al. |
| 8,200,527 | B1 | 6/2012 | Thompson et al. |
| 2003/0084127 | A1 | 5/2003 | Budhiraja et al. |
| 2004/0019500 | A1 | 1/2004 | Ruth |
| 2004/0093381 | A1 | 5/2004 | Hodges et al. |
| 2005/0188345 | A1* | 8/2005 | Chang et al. ............... 717/101 |
| 2005/0222931 | A1 | 10/2005 | Mamou et al. |
| 2005/0223109 | A1 | 10/2005 | Mamou et al. |
| 2005/0256882 | A1 | 11/2005 | Able et al. |

(Continued)

FOREIGN PATENT DOCUMENTS

| JP | 2006099162 A | 4/2006 |
| WO | 2008011122 A2 | 1/2008 |

OTHER PUBLICATIONS

Gu et al., "A stakeholder-driven Service Life Cycle Model for SOA", IW-SOSWE '07, Sep. 3, 2007, 7 pages.

(Continued)

*Primary Examiner* — Jonathan C Teixeira Moffat
*Assistant Examiner* — Lynda Dinh
(74) *Attorney, Agent, or Firm* — Matthew Chung; Hunter E. Webb; Keohane & D'Alessandro PLLC (57) ABSTRACT

An approach that transitions to management of a service oriented architecture (SOA) shared service is provided. In one embodiment, there is a service transition tool, including a project component configured to provide a SOA shared service developed as part of a SOA shared services project, and a planning component configured to plan a transition from development of the SOA shared service to management of the SOA shared service.

8 Claims, 4 Drawing Sheets

(56) References Cited

U.S. PATENT DOCUMENTS

| | | |
|---|---|---|
| 2006/0026049 A1 | 2/2006 | Joseph et al. |
| 2006/0059253 A1 | 3/2006 | Goodman et al. |
| 2006/0069995 A1 | 3/2006 | Thompson et al. |
| 2006/0111921 A1 | 5/2006 | Chang et al. |
| 2006/0129992 A1 | 6/2006 | Oberholtzer et al. |
| 2006/0235733 A1* | 10/2006 | Marks ............... 705/7 |
| 2007/0022404 A1 | 1/2007 | Zhang et al. |
| 2007/0043724 A1 | 2/2007 | Senan et al. |
| 2007/0150480 A1 | 6/2007 | Hwang et al. |
| 2007/0220370 A1* | 9/2007 | Branda et al. ............. 714/49 |
| 2007/0288275 A1 | 12/2007 | Kumar |
| 2008/0028365 A1 | 1/2008 | Erl |
| 2008/0066048 A1 | 3/2008 | Hafermann et al. |
| 2008/0077652 A1 | 3/2008 | Grant et al. |
| 2008/0126390 A1 | 5/2008 | Day et al. |
| 2008/0126406 A1 | 5/2008 | Endabetla et al. |
| 2008/0140857 A1 | 6/2008 | Conner et al. |
| 2008/0163253 A1 | 7/2008 | Massmann et al. |
| 2008/0250386 A1 | 10/2008 | Erl |
| 2008/0282219 A1* | 11/2008 | Seetharaman et al. ......... 717/101 |
| 2008/0288944 A1 | 11/2008 | Coqueret et al. |
| 2009/0055888 A1 | 2/2009 | Little |
| 2009/0089078 A1 | 4/2009 | Bursey |
| 2009/0112646 A1 | 4/2009 | Bruce et al. |
| 2009/0125796 A1 | 5/2009 | Day et al. |
| 2009/0132708 A1 | 5/2009 | Hayward |
| 2009/0204660 A1 | 8/2009 | Chappell |
| 2009/0210499 A1 | 8/2009 | Upadhyayula et al. |
| 2010/0057835 A1 | 3/2010 | Little |
| 2010/0217633 A1 | 8/2010 | Channabasavaiah et al. |

OTHER PUBLICATIONS

Papazoglou et al., "Service oriented architectures: approaches, technologies and research issues", The VLDB Journal (2007), 16, pp. 389-415.

Gewald et al., "A Governance Model for Managing Outsourcing Partnerships", Proceedings of the 39th Hawaii International Conference on System Sciences, 2006, 9 pages.

U.S. Appl. No. 12/391,362, Office Action, Jun. 16, 2011, 51 pages.
U.S. Appl. No. 12/391,362, Office Action, Apr. 16, 2014, 32 pages.
U.S. Appl. No. 12/391,362, Office Action, Sep. 12, 2011, 16 pages.
U.S. Appl. No. 12/393,110, Office Action, Nov. 8, 2011, 10 pages.
U.S. Appl. No. 12/393,110, Notice of Allowance, Apr. 3, 2012, 9 pages.
U.S. Appl. No. 12/392,189, Office Action, Apr. 26, 2013, 29 pages.
U.S. Appl. No. 12/392,189, Office Action, Feb. 24, 2012, 47 pages.
U.S. Appl. No. 12/392,189, Office Action, Sep. 11, 2012, 22 pages.
U.S. Appl. No. 12/391,728, Office Action, Mar. 1, 2012, 15 pages.
U.S. Appl. No. 12/391,728, Notice of Allowance, Oct. 15, 2012, 6 pages.
U.S. Appl. No. 12/391,728, Office Action, Jul. 16, 2012, 14 pages.
U.S. Appl. No. 12/391,728, Office Action, Oct. 27, 2011, 11 pages.
U.S. Appl. No. 12/391,426, Office Action, Apr. 27, 2012, 7 pages.
U.S. Appl. No. 12/391,728, Notice of Allowance, Nov. 8, 2012, 16 pages.
U.S. Appl. No. 12/388,533, Office Action, Mar. 17, 2014, 30 pages.
U.S. Appl. No. 12/388,533, Office Action, Jul. 11, 2011, 19 pages.
U.S. Appl. No. 12/388,533, Office Action, Oct. 24, 2013, 19 pages.
U.S. Appl. No. 12/388,533, Office Action, Aug. 12, 2011, 16 pages.
U.S. Appl. No. 12/277,280, Office Action, Jul. 25, 2014, 44 pages.
U.S. Appl. No. 12/277,280, Office Action, Jan. 16, 2014, 36 pages.
U.S. Appl. No. 12/277,280, Office Action, Jun. 14, 2011, 12 pages.
U.S. Appl. No. 12/277,280, Office Action, May 5, 2011, 13 pages.
U.S. Appl. No. 12/277,280, Office Action, Sep. 13, 2011, 18 pages.
U.S. Appl. No. 12/392,189, Office Action, Aug. 14, 2014, 33 pages.
Arsanjani et al., "SOMA: A Method for Developing Service-Oriented Solutions", IBM Systems J., vol. 47, No. 3., pp. 377-396, 2008.
Thomas L. Mansfield, USPTO Office Action, U.S. Appl. No. 12/391,362, Notification Date Oct. 22, 2014, 27 pages.

* cited by examiner

TRANSITIONING TO MANAGEMENT OF A SERVICE ORIENTED ARCHITECTURE SHARED SERVICE

CROSS-REFERENCE TO RELATED APPLICATION

The present application is related in some aspects to commonly owned and co-pending application entitled "Identification of a Service Oriented Architecture Shared Services Project", which was filed on Nov. 24, 2008, and was assigned application Ser. No. 12/277,280, commonly owned and co-pending application entitled "Evaluating a Service Oriented Architecture Shared Services Project", which was filed on Feb. 19, 2009, and was assigned application Ser. No. 12/388,533, commonly owned and co-pending application entitled "Selecting a Service Oriented Architecture Shared Service", which was filed on Feb. 24, 2009, and was assigned application Ser. No. 12/391,426, commonly owned and co-pending application entitled "Designing a Service Specific Service Oriented Architecture Shared Service Solution", which was filed on Feb. 24, 2009, and was assigned application Ser. No. 12/391,728, commonly owned and co-pending application entitled "Constructing a Service Oriented Architecture Shared Service", which was filed on Feb. 25, 2009, and was assigned application Ser. No. 12/392,189, commonly owned and co-pending application entitled "Management of a Service Oriented Architecture Shared Service", which was filed on Feb. 26, 2009, and was assigned application Ser. No. 12/393,110, commonly owned and co-pending application entitled "Managing Service Oriented Architecture (SOA) Shared Service Escalation", which was filed on Feb. 24, 2009, and was assigned application Ser. No. 12/391,362, the entire contents of which are herein incorporated by reference.

FIELD OF THE INVENTION

This invention relates generally to lifecycle management and more specifically to the management of SOA shared services.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Current IT lifecycle processes are configured to managing self-contained and siloed solutions. However, as businesses transition to service oriented architectures (SOA), traditional IT governance methods are inadequate at managing SOA shared services during their entire lifecycle. SOA is not a self-contained and siloed solution, rather it's a decomposition of solutions delivered as a set of shared services. It is these SOA shared services that require a new lifecycle management system which takes into consideration multiple new processes that are not available or part of existing IT governance systems.

SUMMARY OF THE INVENTION

In one embodiment, there is a method for transitioning to management of a service oriented architecture (SOA) shared service. In this embodiment, the method comprises: providing a SOA shared service developed as part of a SOA shared services project; and planning a transition from development of the SOA shared service to management of the SOA shared service.

In a second embodiment, there is a system for transitioning to management of a service oriented architecture (SOA) shared service. In this embodiment, the system comprises at least one processing unit, and memory operably associated with the at least one processing unit. A service transition tool is storable in memory and executable by the at least one processing unit. The service transition tool comprises: a project component configured to provide a SOA shared service developed as part of a SOA shared services project; and a planning component configured to plan a transition from development of the SOA shared service to management of the SOA shared service.

In a third embodiment, there is a computer-readable medium storing computer instructions, which when executed, enables a computer system to provide a transition to management of a service oriented architecture (SOA) shared service, the computer instructions comprising: providing a SOA shared service developed as part of a SOA shared services project; and planning a transition from development of the SOA shared service to management of the SOA shared service.

In a fourth embodiment, there is a method for deploying a service transition tool for use in a computer system that provides transition to management of a service oriented architecture (SOA) shared service. In this embodiment, a computer infrastructure is provided and is operable to: provide a SOA shared service developed as part of a SOA shared services project; and plan a transition from development of the SOA shared service to management of the SOA shared service.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to transitioning to management of a service oriented architecture (SOA) shared service. In these embodiments, a service transition tool provides this capability. Specifically, the service transition tool comprises a project component configured to provide a SOA shared service developed as part of a SOA shared services project; and a planning component configured to plan a transition from development of the SOA shared service to management of the SOA shared service. The service transition tool transitions SOA shared services that are developed in a construction phase to an operations group responsible for ongoing SOA shared service management.

Figure 1:
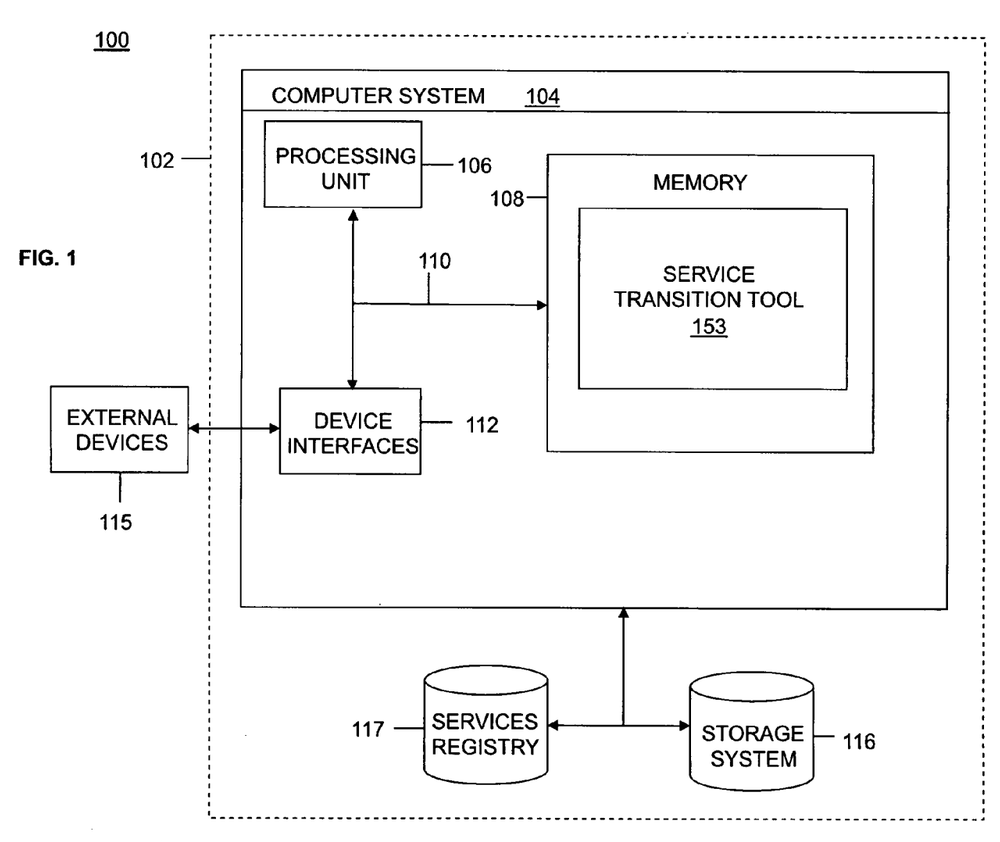
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for transitioning to management of a SOA shared service. It should be understood that any other computers implemented under the present invention may have different components/software, but will perform similar functions. As shown, computer system 104 includes a processing unit 106, memory 108 for storing a service transition tool 153, a bus 110, and device interfaces 112.

Processing unit 106 collects and routes signals representing outputs from external devices 115 (e.g., a keyboard, a pointing device, a display, a graphical user interface, etc.) to service transition tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating service transition tool 153, which is stored in memory 108 and/or storage system 116. While executing computer program code, processing unit 106 can read and/or write data to/from memory 108, storage system 116, and a services registry 117. Services registry 117 stores a plurality of services and associated metadata, as well as rules against which the metadata is compared to locate and store shared services. Storage systems 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
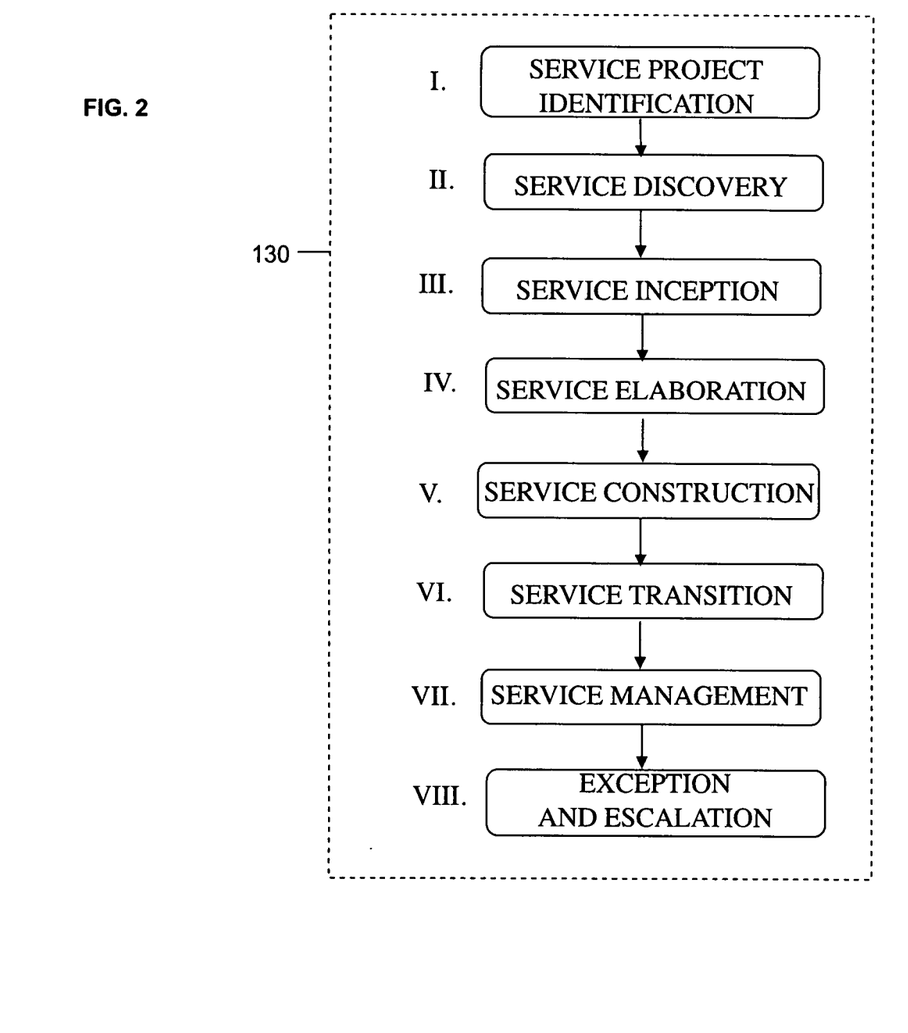
FIG. 2 shows a flow diagram of a SOA services lifecycle management process.

Implementation 100 and service transition tool 153 operate within a broader SOA services lifecycle management process (SLMP) 130, shown in FIG. 2, which identifies, evaluates, implements, and manages a SOA shared service. SOA SMLP 130 provides guidance for managing the entire lifecycle of a shared service(s) within an enterprise. Specifically, SOA SLMP 130 of the present invention includes new and distinct roles, governance checkpoints, increased collaboration requirements, and new decision control points. SOA SMLP 130 takes an extended view in identifying the various touch-points inside and outside of the organization to plan, build and manage shared services. The initial processes starts with the identification of a business initiative(s) (e.g., a business need) having the potential of being a shared service project candidate. The overall set of processes ends with the rollout of shared services fulfilling the identified business initiative, as well as management across its entire life.

SOA SLMP 130 of the present invention consists of the following distinct processes and associated methodologies:

I. New Service Project Identification—the goal of this phase is to evaluate and identify a SOA shared services opportunity (i.e., a business need), and to determine if the SOA shared services opportunity can be met through the use of SOA shared services.

II. Service Discovery—the goal of this phase is to complete the Discovery phase for a project that has been identified as a potential SOA services candidate project.

III. Service Inception—the goal of this phase is to gather the high level requirements for the SOA shared services that will be developed as part of the potential SOA services candidate project.

IV. Service Elaboration—the goal of this phase is to further define the high level requirements from the Inception phase into detailed requirements to complete the service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations group that will be responsible for ongoing SOA shared service maintenance.

VII. Manage Services—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

Each of the above processes is a complete methodology that can be implemented independently since they define key stakeholders, affected processes, and touch-points throughout the organization. It will be appreciated that each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 130, as shown in FIG. 2. It should also be noted that, in some alternative implementations, the functions noted in SOA SLMP 130 may occur out of the order listed above in processes I-VIII. For example, two processes shown in FIG. 2 in succession may, in fact, be executed substantially concurrently. It should also be noted that, in another alternative embodiment, additional or fewer process steps may be included in SOA SLMP 130. Further, each process of the flowchart of FIG. 2 can be implemented by special purpose hardware-based systems that perform the specified functions or acts, or combinations of special purpose hardware and computer instructions.

Figure 3:
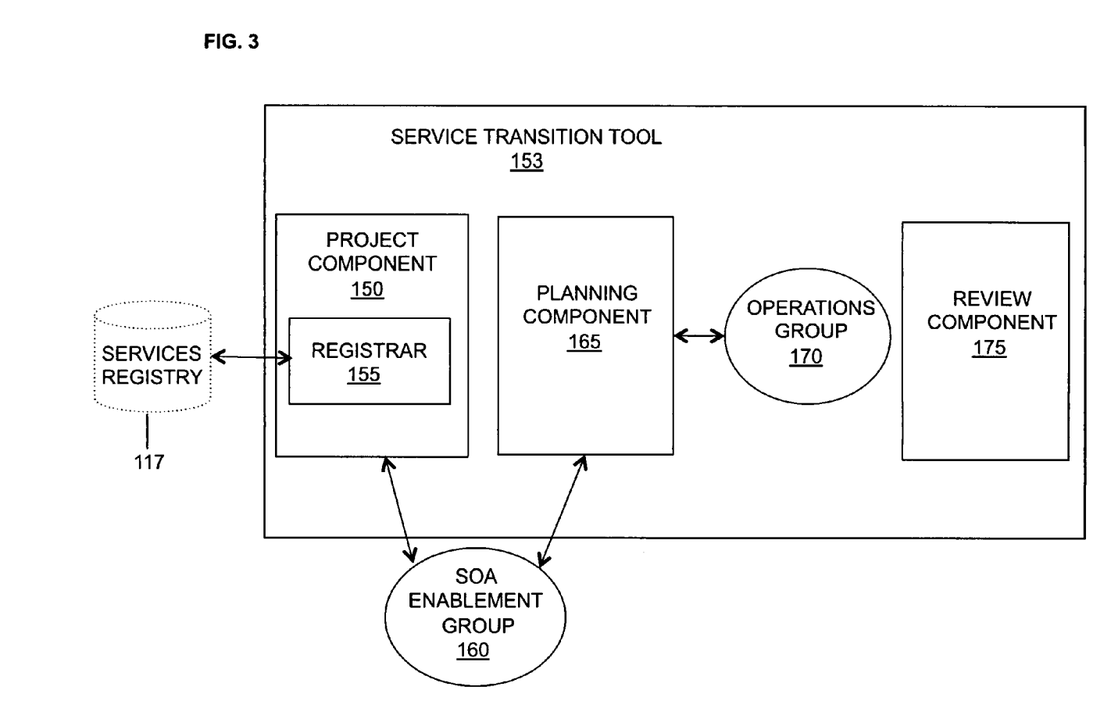
FIG. 3 shows a service transition tool that operates in the environment shown in FIG. 1.

FIG. 3 shows a more detailed view of service transition tool 153, which enables transition of a SOA shared service from construction to management. As shown, service transition tool 153 comprises a project component 150 configured to receive a SOA shared service developed as part of a SOA shared services project. In one embodiment, to accomplish this, a registrar 155 scans services registry 117 for available SOA shared services that have completed the service construction phase (Phase V., FIG. 2) and are considered available for deployment. SOA shared services located by registrar 155 are sent to an SOA enablement group 160, which evaluates the SOA shared service and provides core integration support for the integration components of the SOA shared service. It will be appreciated that SOA enablement group 160 described herein may represent a committee or group of individuals within an organization, or may represent a module, segment, or portion of code, which comprises one or more executable instructions for implementing the transition of the SOA shared service(s).

Next, a transition plan is established to provide guidance and oversight as the SOA shared service transitions from the construction phase to the management phase. In one embodiment, service transition tool 153 comprises a planning component 165 configured to plan a transition from development of the SOA shared service to management of the SOA shared service. Specifically, planning component 165 is configured to establish governance criteria for the management of the SOA shared service. In one embodiment, SOA enablement group 160 receives input to establish the governance criteria. For example, SOA enablement group 160 receives information regarding SOA governance compliance (e.g., architecture and design compliance), transition plan validation requirements, services portfolio and services policies, service transition infrastructure needs, and infrastructure impact analysis of service transition with existing services and infrastructure.

From this input, a series of benchmarks or maintenance guidelines may be established by SOA enablement group 160 to provide future maintenance/management of the SOA shared service. This may include any number of mechanisms, rubrics, or tools necessary for ongoing evaluation and management of the SOA shared service. Once established, planning component 165 is configured to provide the governance criteria for the management of the SOA shared services to an operations group 170 responsible for ongoing maintenance of the SOA shared service. Operations group 170 will be responsible for carrying out the maintenance/management criteria established by SOA enablement group 160. It will be appreciated that operations group 170 described herein may represent a committee or group of individuals within an organization, or may represent a module, segment, or portion of code, which comprises one or more executable instructions for implementing the ongoing maintenance.

In one embodiment, service transition tool 153 further comprises a review component 175 configured to review the SOA shared service after development. Based on the review, it may be necessary to plan additional SOA shared services, as well as plan the creation and support of additional infrastructure to support those SOA shared services. For example, not all business requirements can be met through a set of services in a particular SOA shared services project. Therefore, review component 175 reviews each SOA shared service that is transitioned from development to management, and generates a gap analysis report, which identifies "gaps" in the SOA shared service. These gaps may arise in a number of situations including, but not limited to: multiple instances of a SOA shared service deployed on a distributed enterprise service bus (ESB), service deployments requiring multiple endpoints because of additional requirements (e.g., varying service level agreements, consumer groups, etc.), or multiple replicated environments (e.g., user acceptance test (UAT), system and integration test, and production). Review component 175 analyzes the gap analysis report and provides business and infrastructure requirements necessary to plan additional SOA shared services to address these gaps.

Figure 4:
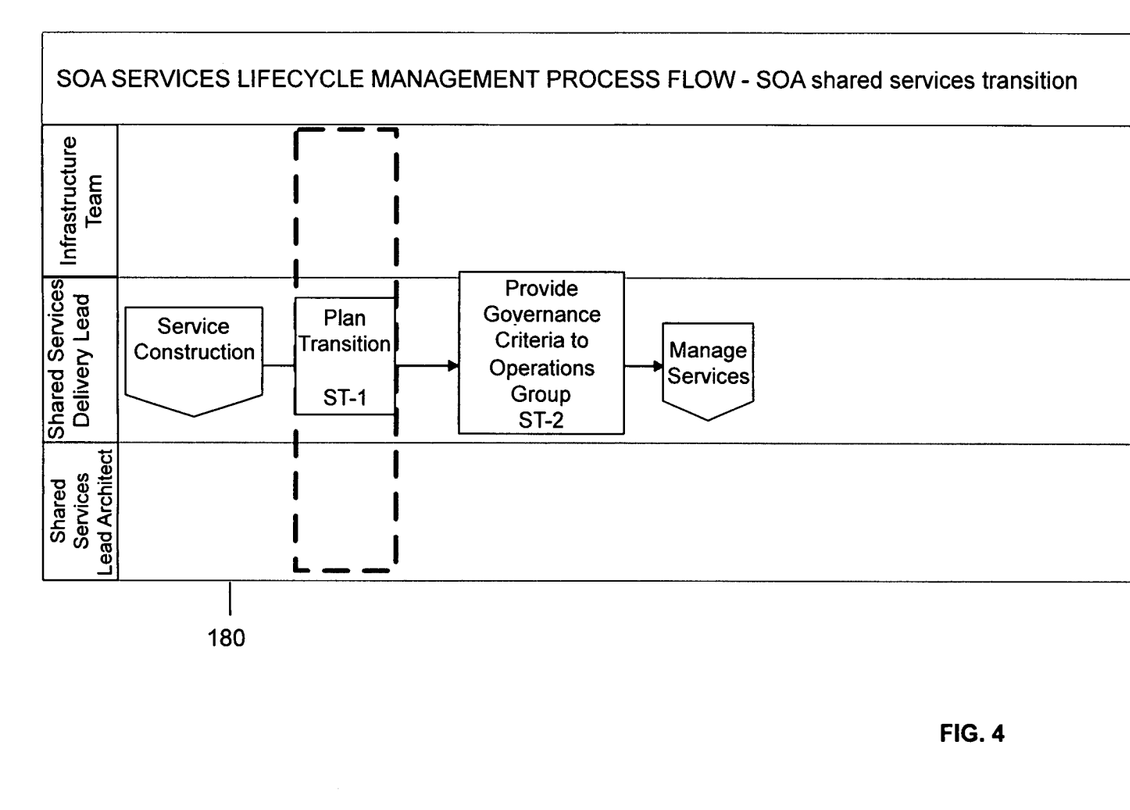
FIG. 4 shows a flow diagram of a SOA services lifecycle management process for transitioning to management of a SOA shared service.

Referring now to FIG. 4, a SOA services lifecycle management process (SLMP) flow 180 for transitioning to management of a SOA shared service will be described in further detail. As shown, the SOA SLMP flow 180 first provides a constructed SOA shared service that was developed as part of a SOA shared services project. Then at service transition-1 (ST-1), SLMP flow 180 plans a transition from development of the SOA shared service to management of the SOA shared service. At ST-2, governance criteria are provided for the management of the SOA shared services to an operations group responsible for ongoing maintenance of the SOA shared service. SLMP flow 180 ends by delivering the SOA shared service to the operations group for continued management.

FIG. 4 also details the organizational roles and responsibilities for each entity in SOA SLMP flow 180. Specifically, SOA SLMP flow 180 identifies shared service roles indicating the primary and secondary (if applicable) roles for each entity (i.e., shared services lead architect, shared services delivery lead, infrastructure team) at each process of the service transition phase. For example, at ST-1, the shared services delivery lead is considered to have primary responsibility for planning the transition of the SOA shared service. Both the shared services lead architect and the infrastructure team are considered to have secondary responsibility. This may mean that the share services delivery lead is given main authority to provide a service transition plan at ST-1. In this regard, SOA SLMP flow 180 governs the rules of engagement between the various entities. SOA SLMP flow 180 provides integration points between the various entities across different organizational domains involved in the development, deployment, transition, and management of SOA shared services, as discussed herein.

It will be appreciated that SOA SLMP flow 180 of FIG. 4 represents one possible implementation of a process flow for transitioning to management of a SOA shared service, and that other process flows are possible within the scope of the invention. SOA SLMP flow 180 illustrates the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to provide transition to management of a SOA shared service, as shown in FIG. 1. In this case, service transition tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for transitioning to management of a SOA shared service. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for transitioning to management of a service oriented architecture (SOA) shared service comprising:

automatically retrieving, using a computing device, a SOA shared service from a plurality of SOA shared services in a services registry, the SOA shared service having been previously developed as part of a SOA shared services project and having completed a service construction phase and being available for deployment;

planning, using the computing device, after development has been completed, a transition from development of the SOA shared service to management of the SOA shared service by establishing governance criteria for the management of the SOA shared service;

providing, to an operations group responsible for post-development ongoing maintenance of the SOA shared service, a set of maintenance guidelines that provide requirements for maintaining the SOA shared service and a set of tools necessary for satisfying the requirements of the maintenance guidelines, wherein the set of maintenance guidelines and the set of tools are generated by an SOA enablement group; and reviewing, using the computing device, the SOA shared service, after the development, based on the governance criteria and the maintenance guidelines to determine whether a deficiency with the SOA shared service exists and, based on a determination that a deficiency exists, using the governance criteria and the maintenance guidelines to transition at least one additional SOA shared service in conjunction with the SOA shared service, wherein all of the processes of the method are performed subsequent to the service construction phase of a SOA services lifecycle process (SLMP).

2. The method according to claim 1 further comprising providing, using the computing device, the governance criteria for the management of the SOA shared services to the operations group responsible for ongoing maintenance of the SOA shared service.

3. A system for transitioning to management of a service oriented architecture (SOA) shared service comprising:

at least one processing unit;

memory operably associated with the at least one processing unit; and a service transition tool storable in memory and executable by the at least one processing unit, the service transition tool comprising:

a project component configured to automatically retrieve a SOA shared service from a plurality of SOA shared services in a services registry, the SOA shared service having been previously developed as part of a SOA shared services project and having completed a service construction phase and being available for deployment;

a planning component configured to:

plan, after development has been completed, a transition from development of the SOA shared service to management of the SOA shared service by establishing governance criteria for the management of the SOA shared service; and provide, to an operations group responsible for post-development ongoing maintenance of the SOA shared service, a set of maintenance guidelines that provide requirements for maintaining the SOA shared service and a set of tools necessary for satisfying the requirements of the maintenance guidelines, wherein the set of maintenance guidelines and the set of tools are generated by an SOA enablement group; and a review component configured to review the SOA shared service, after the development, based on the governance criteria and the maintenance guidelines to determine whether a deficiency with the SOA shared service exists and, based on a determination that a deficiency exists, using the governance criteria and the maintenance guidelines to transition at least one additional SOA shared service in conjunction with the SOA shared service, wherein all of the processes of the service transition tool are performed subsequent to the service construction phase of a SOA services lifecycle process (SLMP).

4. The service transition tool according to claim 3, the planning component further configured to provide governance criteria for the management of the SOA shared services to the operations group responsible for ongoing maintenance of the SOA shared service.

5. A non-transitory computer-readable storage medium storing computer instructions, which when executed, enables a computer system to transition to management of a service oriented architecture (SOA) shared service, the computer instructions comprising:

automatically retrieving, using a computing device, a SOA shared service from a plurality of SOA shared services in a services registry, the SOA shared service having been previously developed as part of a SOA shared services project and having completed a service construction phase and being available for deployment;

planning, after development has been completed, a transition from development of the SOA shared service to management of the SOA shared service by establishing governance criteria for the management of the SOA shared service;

providing, to an operations group responsible for post-development ongoing maintenance of the SOA shared service, a set of maintenance guidelines that provide requirements for maintaining the SOA shared service and a set of tools necessary for satisfying the requirements of the maintenance guidelines, wherein the set of maintenance guidelines and the set of tools are generated by an SOA enablement group; and reviewing the SOA shared service, after the development, based on the governance criteria and the maintenance guidelines to determine whether a deficiency with the SOA shared service exists and, based on a determination that a deficiency exists, using the governance criteria and the maintenance guidelines to transition at least one additional SOA shared service in conjunction with the SOA shared service, wherein all of the computer instructions are performed subsequent to the service construction phase of a SOA services lifecycle process (SLMP).

6. The non-transitory computer-readable storage medium according to claim 5 further comprising computer instructions for providing the governance criteria for the management of the SOA shared services to the operations group responsible for ongoing maintenance of the SOA shared service.

7. A method for deploying a service transition tool for use in a computer system that provides a transition to management of a service oriented architecture (SOA) shared service, comprising:

providing a computer infrastructure operable to:
  automatically retrieve a SOA shared service from a plurality of SOA shared services in a services registry, the SOA shared service having been previously developed as part of a SOA shared services project and having completed a service construction phase and being available for deployment;
  plan, after development has been completed, a transition from development of the SOA shared service to management of the SOA shared service by establishing governance criteria for the management of the SOA shared service;
  provide, to an operations group responsible for post-development ongoing maintenance of the SOA shared service, a set of maintenance guidelines that provide requirements for maintaining the SOA shared service and a set of tools necessary for satisfying the requirements of the maintenance guidelines, wherein the set of maintenance guidelines and the set of tools are generated by an SOA enablement group; and
  review the SOA shared service, after the development, based on the governance criteria and the maintenance guidelines to determine whether a deficiency with the SOA shared service exists and, based on a determination that a deficiency exists, using the governance criteria and the maintenance guidelines to transition at least one additional SOA shared service in conjunction with the SOA shared service,
  wherein all of the processes of the method are performed subsequent to the service construction phase of a SOA services lifecycle process (SLMP).

8. The method according to claim 7, the computer infrastructure operable to plan further operable to provide governance criteria for the management of the SOA shared services to the operations group responsible for ongoing maintenance of the SOA shared service.

* * * * *